United States Patent [19]

Matsumura

[11] Patent Number: 4,591,256
[45] Date of Patent: May 27, 1986

[54] BEAM SPLITTER AND LIGHT MEASURING DEVICE FOR CAMERA

[75] Inventor: Susumu Matsumura, Yokohama, Japan

[73] Assignee: Canon Kabushiki Kaisha, Tokyo, Japan

[21] Appl. No.: 550,238

[22] Filed: Nov. 8, 1983

[30] Foreign Application Priority Data

Nov. 8, 1982 [JP] Japan .................... 57-195763
Nov. 8, 1982 [JP] Japan .................... 57-195764

[51] Int. Cl.⁴ .............................................. G03B 3/00
[52] U.S. Cl. .................................. 354/402; 354/406; 350/162.23
[58] Field of Search ............... 250/229; 350/162.11, 350/162.17, 162.23, 311, 402; 354/404, 479, 481, 483, 406, 407, 408, 476, 478

[56] References Cited

U.S. PATENT DOCUMENTS

| 4,172,646 | 10/1979 | Matsumoto | 354/478 |
| 4,352,545 | 10/1982 | Uno et al. | 354/406 |
| 4,436,398 | 3/1984 | Endo et al. | 350/162.23 |
| 4,443,081 | 4/1984 | Suzuki | 354/479 |
| 4,445,764 | 5/1984 | Matsumura | 354/481 |

Primary Examiner—L. T. Hix
Assistant Examiner—David M. Gray
Attorney, Agent, or Firm—Toren, McGeady, Stanger, Goldberg & Kiel

[57] ABSTRACT

A plural number of transparent plates are arranged in parallel, a relief type diffraction grating is formed on the surface of one of the transparent plates and both transparent plates are joined so to make a beam splitter which is used as the light measuring device of a camera.

7 Claims, 14 Drawing Figures

und Light MEASURING
BEAM SPLITTER AND LIGHT MEASURING DEVICE FOR CAMERA

BACKGROUND OF THE INVENTION

1. Field of the Invention

The present invention relates to a beam splitter for a camera and a light measuring device for a camera in which the beam splitter is used.

2. Description of the Prior Art

Figure 1:
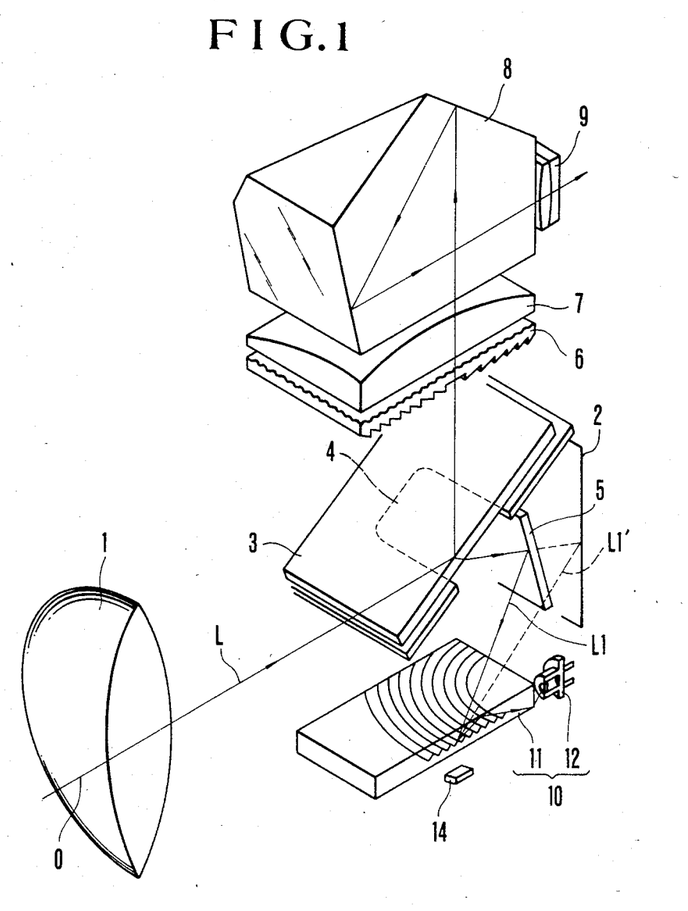
FIG. 1 is an exploded perspective view showing an arrangement of the principal members of the light measuring device using the beam splitter of the prior application.

Until now many systems have been known for the light measuring device for single lens reflex cameras, and a light measuring device of the type shown in FIG. 1 is disclosed in U.S. patent application Ser. No. 371,017 filed Apr. 22, 1982, now U.S. Pat. No. 4,443,081.

In the case of the above proposed device, a quick return mirror 3 which is brought out of the optical path when taking a picture is arranged in front of the film plane 2 on the optical axis O of the photographic lens 1, and the quick return mirror 3 has a semi-transmitting portion 4 for passing light to the light measuring optical system and behind the mirror a submirror 5 for reflecting the light downwards is arranged, formed as one unit with the quick return mirror 3. Further above the quick return mirror 3, the focus plate 6, the condenser lens 7 and the pentagonal prism 8 are provided in sequence along the path of the light, while on the surface of the pentagonal prism at which the light is emitted an eye piece lens 9 is provided so as to enable viewing of an object.

The light beam L1 for light measurement passing through the semi-transmitting portion 4 of the quick return mirror 3 and incident upon the submirror 5 is reflected downwards by the submirror 5 and led to the light measuring optical system 10. The light measuring optical system 10 consists of a beam splitter 11 having a fine diffraction grating on the surface and a photoelectric transducing element 12 arranged at the position on the end surface at which the light is condensed. The light beam L1 is effectively led inside by the fine diffraction grating on the surface of the beam splitter 11, repeatedly and totally reflected in the inside, condensed at the end surface and incident upon the photoelectric transducing element 12. Further, the quick return mirror 3 is raised at the time of flash light photographing so that the photographic light beam L from the photographic lens 1 is led to the beam splitter 11 as the light beam L1' diffused on the film surface 2 as is shown in a dotted line.

Although in the case of the light measuring optical system as mentioned above, a compact light measuring optical system can be realized with the thin plate-like beam splitter 11 by effectively using a fine diffraction grating, the system has a defect in that change-over of the distribution of the light sensitivity to a degree required with current technology cannot be achieved.

Further, quite recently a camera, particularly a single lens reflex cameras having automatic focus adjusting means have been built and developed. In the case of most automatic focus adjusting device for single lens reflex cameras, a focus detecting element such as CCD (change coupled device) for sensing the object light via the photographic lens is arranged at the position optically equivalent to the film plane in such a manner that the in-focus signal is produced according to the output signal from the focus detecting element so as to move the photographic lens in order to obtain correct focusing. Taking the arrangement of other members and other units of the single lens reflex camera into consideration, it is convenient to arrange this focus detecting element at the bottom of the mirror box which bears the inclined rotatable mirror.

In the case of a light measuring device in which the beam splitter 11 of the light measuring device shown in FIG. 1 is provided, the focus detecting element 14 has to be arranged beneath the beam splitter 11.

However, the above-mentioned beam splitter 11 is constructed so as to direct the object light reflected by the submirror to the light measuring element 12 so that there is caused a problem in that the focus detecting element 14 cannot receive a sufficient amount of light and that an accurate focus signal cannot be obtained from the focus detecting element 14. Further, it is necessary that the object light with less noise should be directed to the focus detecting element, but there is a fear in the conventional art that a part of the light reflected from the diffraction structure would be incident on the focus detecting element as noise light.

The beam splitter of the present invention distributes the light to the two control systems of the light measuring device and the focus detecting device of the camera without causing noise light, while the conventional beam splitter does not have a distribution function of the object light such as mentioned above.

For example, in U.S. Pat. No. 4,172,646 a diffraction grating is used in the light measuring device for a camera, wherein the object light is directed along the direction of the light measuring element by making use of the total reflection, so that the structure is not sufficient for leading the object light to the focus detecting element.

Further, in the case of the device for detecting light and/or focusing by making use of a diffraction grating as mentioned above, it is necessary to control the amount of the object light incident on the light measuring device by changing over the distribution of the light measuring sensitivity according to the brightness distribution of the object light in the picture frame, whereby in the case of the conventional light measuring system, particularly using the diffraction grating the development of techiques for changing over the sensitivity distribution is delayed.

SUMMARY OF THE INVENTION

It is an object of the present invention to provide a beam splitter effective for use in the light measuring and the focus detecting device for a camera.

It is another object of the present invention to provide a light measuring and a focus detecting device using the above beam splitter.

It is further another object of the present invention to provide a light measuring device using a beam splitter whose light measuring sensitivity distribution can be changed over.

BRIEF DESCRIPTION OF THE DRAWINGS

FIGS. 2 (a), (b) and (c) and FIGS. 3 (a), (b) and (c) show the beam splitters of the present invention, whereby FIGS. 2 (a), (b) and FIGS. 3 (a), (b) show the respective beam splitters in a developed perspective view, FIG. 2 (b) and FIG. 3 (b) their section and FIG. 2 (c) and FIG. 3 (c) the trace of the incident object light

FIGS. 8 and 9 (a), (b) show the structures of the filter for the light measuring device shown in FIG. 7.

DESCRIPTION OF THE PREFERRED EMBODIMENTS

Figure 2A:
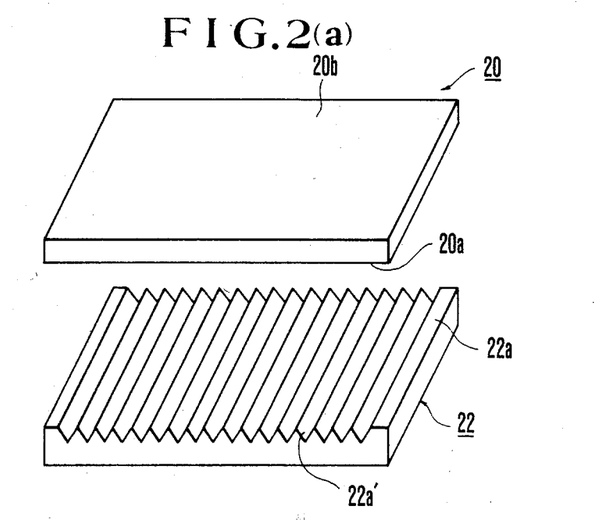
Figure 2B:
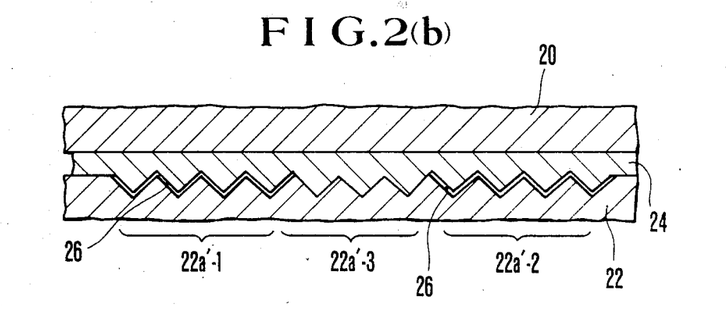
Figure 2C:
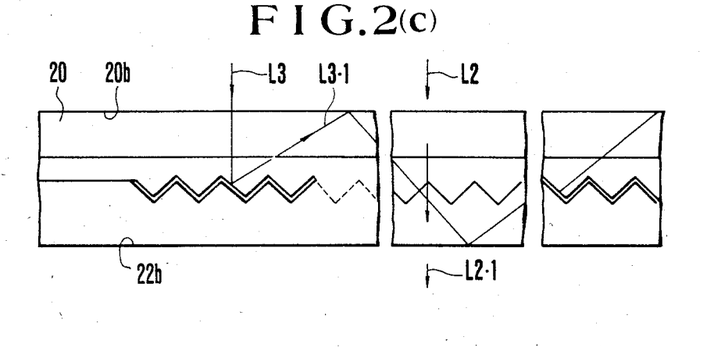
Figure 3A:
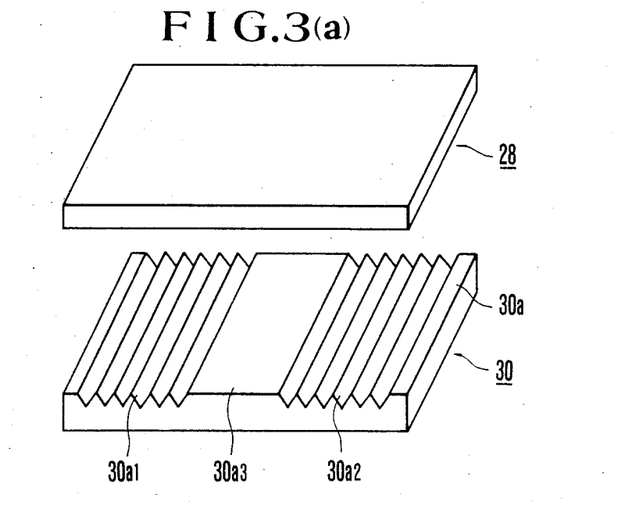
Figure 3B:
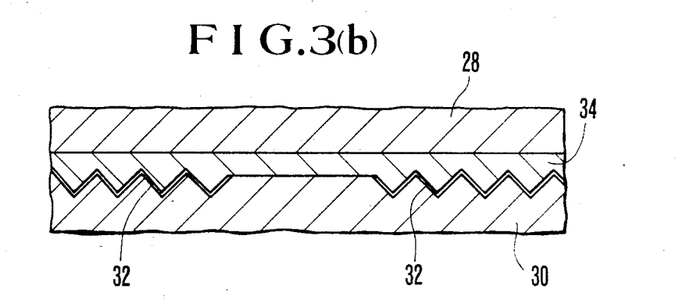
Figure 3C:
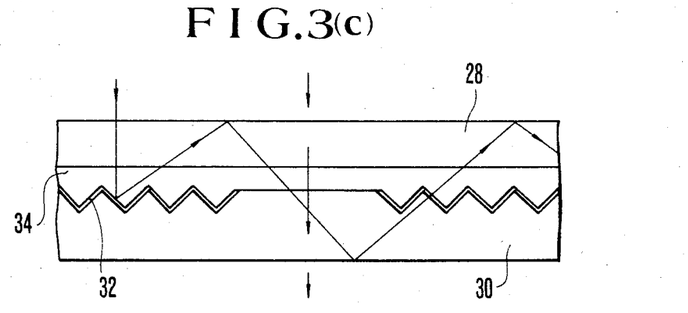

FIGS. 2 (a), (b) and (c) and FIGS. 3 (a), (b) and (c) show embodiments of the beam splitter of the present invention.

In FIGS. 2 (a), (b) and (c), the numerals 20, 22 represent the first and the second transparent plates. The first and the second transparent plates 20 and 22 are fixed by a transparent binder 24 in such a manner that the surfaces 20a and 22a facing each other are parallel to each other. The upper surface 20b and the lower surface 20a of the first transparent plate 20 are finished flat. On the surface 22a of the second transparent plate 22 facing the first transparent plate 20 is formed a convex and concave structure 22a' with a certain determined inclination angle, whereby the convex-concave structure 22a' forms a relief type diffraction grating.

On the upper left side 22a'-1 and the upper right side 22a'-2 of the convex-concave structure 22a' forming the diffraction grating a reflection film 26 is formed by vapor deposition, while on the central part 22a'-3 between the left side part 22a'-1 and the right side part 22a'-2 no reflection film is formed. The reflection film may suitably consist of $SiO_2$ or $ZnO_2$.

The first transparent plate 20 and the second transparent plate 22 in FIG. 2 (a) are fixed by transparent binder 24, and as the circumferential parts 22a'-1, 22a'-2 of the second transparent plate 22 are deposited with the reflection film, when the first and the second transparent plates 20, 22 are superposed, a gap corresponding to the thickness of the reflection film 26 is formed between the two plates 20 and 22. This gap is also filled with the binder. The transparent binder 24 has the same refractive index as that of the transparent plate 22.

FIG. 2 (c) shows a partial enlargement of the beam splitter shown in FIGS. 2 (a), (b) and the trace of light beams L2 and L3.

The object light L3 incident on the left and right parts, having the reflection film 26, of the diffraction grating 22a' shown in FIG. 2 (b) is reflectively diffracted on the reflection film 26 and the reflectively diffracted light L3-1 is totally reflected on the upper surface 20b of the transparent plate 20 and then repeatedly totally reflected between the transparent plate 20 and the lower surface 22b of the lower transparent plate 22 until it is incident on a light measuring element (not shown) positioned on the side surface of the beam splitter.

The object light L2 incident on the central part 22a'-3, having no reflection film on the diffraction structure passes through the first transparent plate 20, the binder 24 and the second transparent plate 22 until the light beam L2-1 is incident on a focus detecting element (not shown) positioned on the lower side of the second transparent plate 22.

Thus, in case the refractive index of the first and the second transparent plates 20 and 22 is made equal to that of the transparent binder 24, the convex and concave structure in the part on which no reflection film is formed optically disappears and the light beam L2 incident on the central part 22a'-3 reaches the focus detecting element without producing any noise light as is likely when the light beam passes through a simple transparent plate.

FIGS. 3 (a), (b) and (c) show another embodiment of the beam splitter.

In the drawing, 28 and 30 represent the first and the second transparent plates. On the upper surface 30a of the second transparent plate 30 are provided the surfaces 30a1 and 30a2 having convex and concave diffraction gratings and the surface 30a3 having no convex and concave diffraction gratings. On the surface of the diffraction gratings 30a1 and 30a2 is formed a reflection film 32 similar to that of the embodiment shown in FIGS. 2 (a), (b) and (c).

The object light incident on the area 30a1 and 30a2 having diffraction gratings of the beam splitter shown in FIGS. 3 (a), (b) and (c) reaches the reflection film 32, after having passed through the first transparent plate 28 and the transparent binder 34, is reflectively diffracted on the reflection film 32, totally reflected on the upper surface of the first transparent plate 28 and repeatedly reflected between the first transparent plate 28 and the second transparent plate 30 until it reaches the light measuring element positioned on the side surface of the diffraction assembly.

The object light incident upon the central part 30a3 of the second transparent plate 30 passes through the first transparent plate, the transparent binder and the second transparent plate and is incident upon the focus detecting element (not shown) positioned at the lower side of the second transparent plate 30.

The beam splitter shown in FIGS. 2 (a), (b) and (c) and that shown in FIGS. 3 (a), (b) and (c) have their own features.

As to the convex-concave diffraction grating on the upper surface of the second transparent plates 22, 30, it is easier to provide it evenly on the whole surface as in the case of the embodiment shown in FIGS. 2 (a), (b) and (c).

However, in case the first transparent plate 20 and the second transparent plate 22 are fixed by the binder 24, it is easier for the structure having a plate 30a3 at the central part as in the case of the embodiment shown in FIGS. 3 (a), (b) and (c) to obtain the parallelism of both plates so as to maintain the accuracy of the beam splitter.

Further even when the refractive index of the binder 34 changes and there is a slight difference between the refractive index of the binder 34 and that of the second transparent plate 30, harmful diffraction light is not produced so that a good object light beam can be directed to the focus detecting element.

By means of the beam splitter shown in FIGS. 2 (a), (b) and (c) and FIGS. 3 (a), (b) and (c) the object light beam is divided and led to the light measuring system and to the focus detecting system, whereby a good object light beam free from the harmful influence of the diffraction can be directed to the focus detecting element positioned especially at the lower part of the beam splitter so that a correct focus detecting output is obtained.

Figure 4:
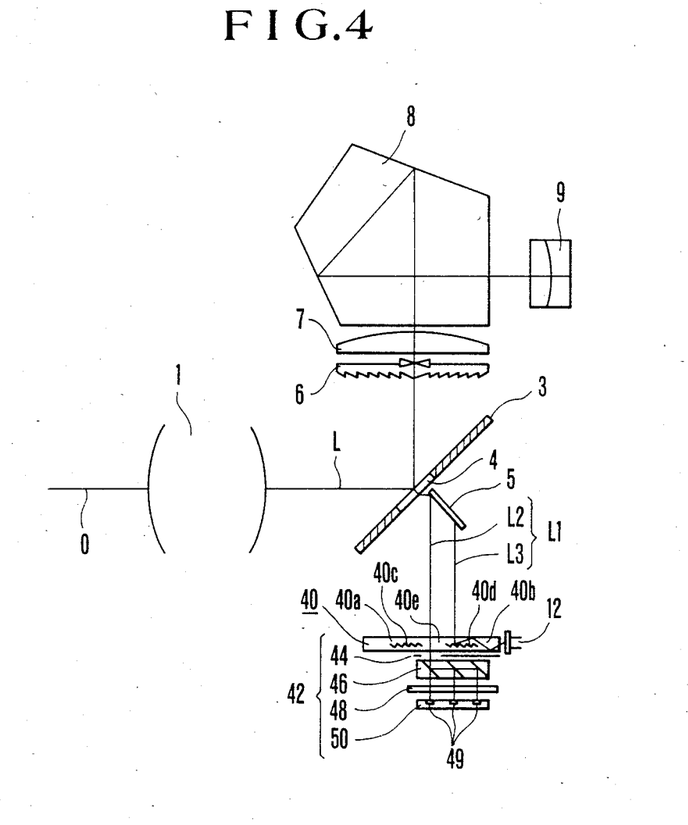
FIG. 4 is a schematic view which shows the arrangement of the principal member of the light measuring device using the beam splitter shown in FIGS. 2 (a), (b) and (c) or FIGS. 3 (a), (b) and (c).

Below, the embodiment of the beam splitter shown in FIGS. 2 (a), (b) and (c) or FIGS. 3 (a), (b) and (c) used as the light measuring device of the single lens reflex camera is shown in FIG. 4. In FIG. 4 the same numerical references as those in FIG. 1 represent the same members. 40 is the beam splitter shown in FIGS. 2 (a), (b) and (c) and FIGS. 3 (a), (b) and (c), whereby the photoelectric transducing element 12 is arranged at the light condensing position of the beam splitter 40.

Further, at the lower part of the beam splitter 40 is arranged the focus detecting optical system 42 which comprises an opening 44, the light beam splitting prism 46, the cover glass 48 and the silicone base plate 50 having three line sensors 49. Inside the beam splitter, fine diffraction gratings 40c and 40d are formed on the circumferential parts 40a and 40b excepting the central part 40e as shown in FIGS. 2 (a), (b) and (c) and FIGS. 3 (a), (b) and (c). As the fine diffraction gratings 40c and 40d, for example, a dielectric reflection film such as mentioned above is coated on a relief type diffraction grating and the cover transparent member is cemented on it with binder having the same refractive index as that of the optical member of the beam splitter 40.

In the case of the present embodiment of such a structure, a part L1 of the object light beam L coming through the photographing lens passes through the semitransmitted part 4 of the quick return mirror 3, is reflected downwards by the submirror 5, while the part L2 incident upon the central part 40e of the beam splitter 40 is led to the opening 44 of the focus detecting optical system 42, the light splitting prism 46, the cover glass 48 and the silicone base plate 50 almost without loss of the amount of light. To the light beam L2 the length difference of the optical path is given in the light beam splitting prism 46 in such a manner that the infocus state is judged based upon the pattern incident on each line sensor. Further, the light beam L3 incident on the circumferential parts 40a and 40b of the beam splitter 40 is reflected and diffracted by the fine diffraction gratings 40c and 40d, totally reflected in the inside of the beam splitter 40 so as to be condensed on the photoelectric transducing element 12 in such a manner that the brightness of the object can be measured to direct the light amount.

Figure 5:
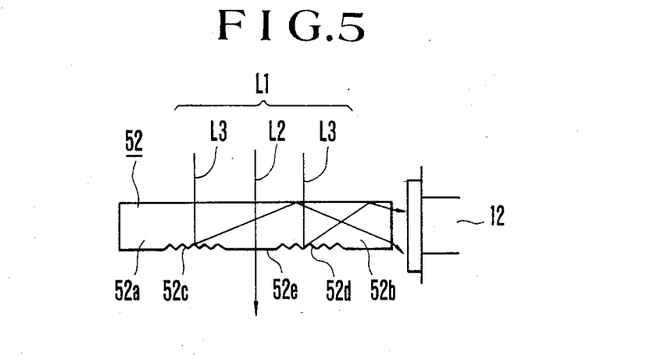
FIGS. 5 and 6 are schematic views which show the structures of the beam splitter used for the light measuring device shown in FIG. 4 and the traces of the incident light.

FIG. 5 shows another embodiment 52 of the beam splitter, in which relief type fine diffraction gratings 52c and 52d are provided at the circumferential parts 52a and 52b of the base surface of the transparent plate and a reflection film having a certain reflectivity is coated on the convex-concave structure. Consequently, the light L2, incident upon the central part 52e, of the light L1 incident upon the beam splitter 52 is directed to the focus detecting optical system 42 almost without decrease in the light amount in the same way as in the case of FIG. 4, while the light L3 incident on the fine diffraction gratings 52c and 52d is totally reflected in the inside of the beam splitter 52 so as to be incident upon the photoelectric transducing element 12 to be used for the light measurement.

Figure 6:
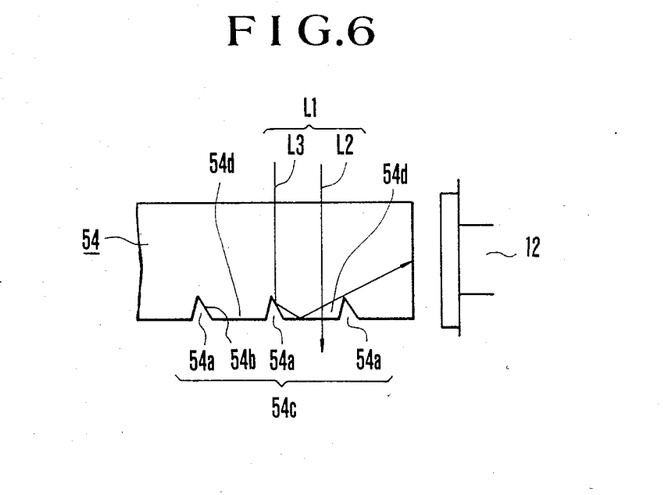

Further, in the case of the embodiment 54 of the beam splitter shown in FIG. 6, a fine diffraction structure is provided only at the circumferential part in the same way as in the case of FIG. 5, whereby the structure of the beam splitter 54 is different from that in FIG. 5 in that a fine diffraction structure 54c having key-shaped notches 54b at certain intervals is formed on the base surface. The light L3, incident on the notch 54a, of the light L1 incident upon the beam splitter 54 is totally reflected on the right inclined part 54b and totally reflected in the inside of the beam splitter 54 so as to be incident upon the photoelectric transducing element 12 to be used for the light measurement. The light beam L2 incident upon a part 54d other than the notched part 54a on the base surface passes through the beam splitter 54 so as to be incident upon the focus detecting optical system 21.

As explained above, the light measuring device of the present invention for a single lens reflex camera has a light splitting device for splitting the incident light for the light measuring photoelectric transducing element and for the focus detecting optical system so that the light measuring optical system and the focus detecting optical system can be provided in the same space in the camera body, whereby the light amount incident on the both systems can be properly divided.

Figure 7:
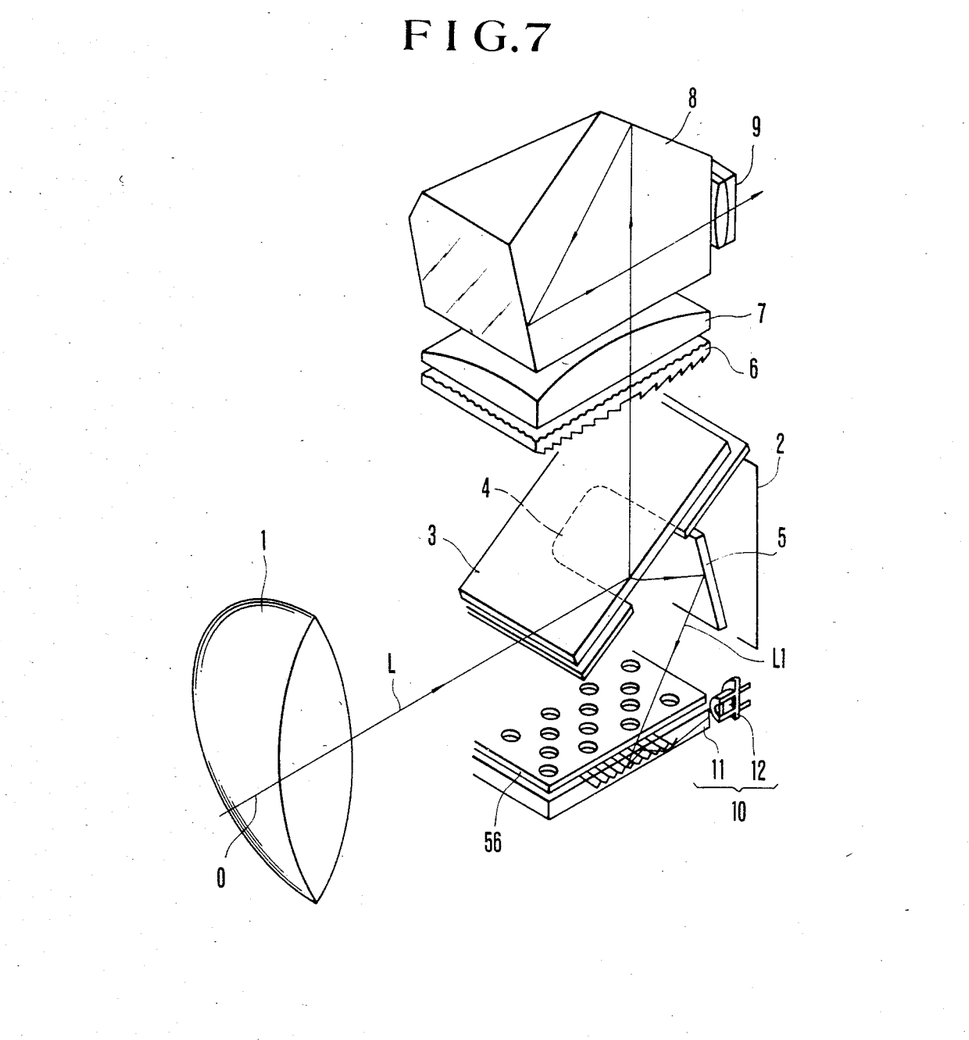
FIG. 7 is an exploded perspective view which shows the arrangement of the principal member of the light measuring device whose light measuring sensitivity distribution can be changed over.
Figure 8:
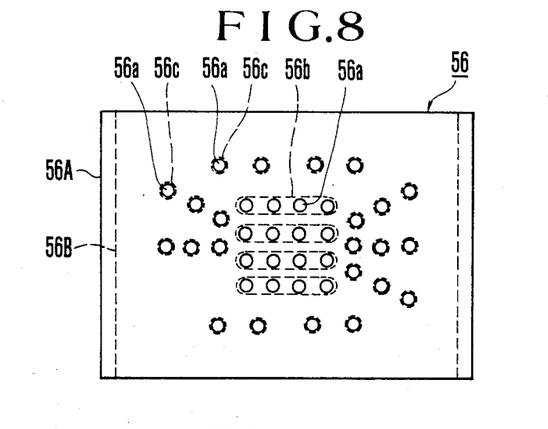
Figure 9A:
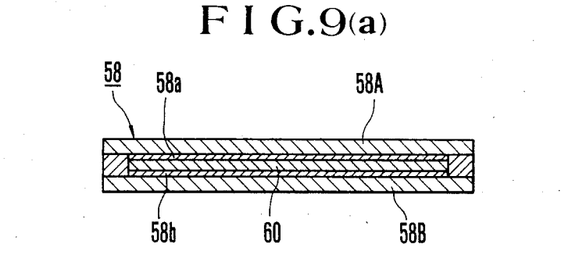
Figure 9B:
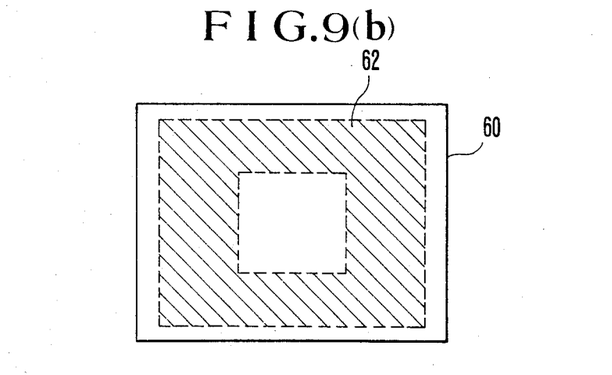

FIGS. 7, 8 and 9 (a) and (b) show another embodiment of the present invention. The beam splitter shown in FIGS. 2 (a), (b) and (c) and FIG. 6 and the light measuring and/or the focus detecting device have an excellent efficiency for dividing the object light for the light measuring element and the focus detecting element. In the case of the light measuring or the focus detecting device as mentioned above, a still wider application can be realized by changing over the distribution of the light measuring sensitivity according to the brightness distribution of the object.

In FIG. 7 the same numerical references as those in FIG. 1 represent the same members.

As the beam splitter 11, those shown in FIG. 1 or in FIGS. 2 (a), (b) and (c) or in FIGS. 3 (a), (b) and (c) or a conventional one are used. 56 is a filter means for adjusting the light intensity distribution incident upon the beam splitter 11 to change the sensitivity distribution of light metering. The filter means 56 consists of the first and the second plate-like light shading member 56A and 56B superposed at the position parallel to the beam splitter 11. As shown in FIG. 8, in the first plate-like light shading member 56A of the filter means 56 a certain determined number of fine openings 56a are provided at certain distances and distribution, while as shown by the dotted line, at the center of the second plate-like light shading member 56B are provided a plural number of laterally long penetrating holes 56b and round holes 56c. The light passes only through the part at which the penetrating holes 56a, the round holes 56c and the laterally long holes 56b of the first and the second plate-like light shading members 56A, 56B are superposed. The first and the second light shading members 56A and 56B are moved by remote operation, for example, a link mechanism, relatively, or laterally in FIG. 8.

The present embodiment being constructed as mentioned above, a part of the photographic light L incident via the photographic lens is reflected downwards by the submirror 5, after passage through the semitransmitting part 4 of the quick return mirror 3, and falls incident on the beam splitter 11 via the filter 56 and is condensed upon the photoelectric transducing element 12 so as to measure the brightness of the object. When in this case the light L1 is incident upon the filter 56, the light L1 can pass through the part at which the round hole 56a of the light shading member 56A of the filter and the round hole 56c and the rectangular hole 56b of the light shading member 56B of the filter are superposed but is shaded at the other parts. Consequently, in the case as shown in FIG. 8, the round hole 56a is superposed on the round hole 56c and the rectangular hole 56b, the effective transmittance of the incident light L1 depends upon the transmittance of the first light shading member 56A.

In case one of the light shading members 56A and 56B is slid laterally with respect the other light shading member by an amount corresponding to the diameter of the round holes 56a, the round holes 56a are not superposed on the round holes 56b at the circumferential part so that the light cannot pass. On the other hand, the permeability at the central part in FIG. 8 does not change because the rectangular hole 56b is laterally long at the central part, so that the central part light measurement is realized, whereby the effective transmission exists only at the central part. Consequently, by relatively moving the first and the second light shading parts 56A and 56B, it is possible to change the effective transmittance distribution of the incident light L1 to the beam splitter 11 so as to be able to realize change-over of the light measurement distribution.

Hereby, the filter for changing over the distribution of the light transmittance is not limited to that shown in FIG. 8. For example, it is possible to use, a filter with a liquid crystal of the guest-host type shown in FIGS. 9 (a) and (b). Namely, as shown in FIG. 9 (a), this filter has two glass base plates 58A and 58B. Transparent electrodes 58a and 58b are provided inside the respective glass base plates 58A and 58B and between the transparent electrodes 58a and 58b there is provided a liquid crystal layer 60 whose electrode pattern is shown in black upon the voltage application. When a voltage is applied, the electrode pattern 62 of the liquid crystal layer 60 with oblique lines in FIG. 9 (b) is closed so as to absorb the light so that the transmittance of the incident light L1 changes. Consequently, it is possible to change over the distribution of the light measurement sensitivity by carrying out the partial light measurement in the state in which the voltage is applied upon the liquid crystal layer 60 and the mean light measurement in the state in which no voltage is applied.

The filter for changing over the distribution of the light transmittance shown in FIGS. 8 and 9 (a) and (b) can be applied not only to the above-mentioned conventional beam splitter and the beam splitter 11 shown in FIG. 1 but also to other light condensing optical elements. The shape and the distribution of the holes of the filter 56 shown in FIG. 8 are not restricted to that embodiment. The same thing can be said of the filter 58 shown in FIGS. 9 (a) and (b). The filter is effective not only in a case where the light reflected by the submirror 5 is used but also in a case where the light diffused and reflected by the film surface or the shutter plane is used.

In the embodiments shown in FIG. 4 and the following figures, at the side surface of the beam splitters 11, 40, 52, 54 is provided the light measuring element, while at the lower part of the beam splitter is provided the detecting optical system 42 including the focus detecting element. Also, it goes without saying that the systems can be arranged in the reversed relation.

What I claim:

1. A beam splitter for splitting light from an object to a photometric device comprising:
   (a) a first transparent plate;
   (b) a second transparent plate superposed on said first transparent plate;
   (c) a diffraction grating provided on a surface of said first transparent plate in opposed relationship to said second transparent plate, and having first areas with a reflection layer thereon and a second area with no reflection layer thereon, said second area being located between said first areas; and
   (d) binder means for binding said first and said second transparent plates, said binder means having a refractive index which is the same as that of said first and said second transparent plates and filling a gap between said first and second transparent plates.

2. A beam splitter for splitting light from an object to a photometric device comprising:
   (a) a first transparent plate;
   (b) a second transparent plate superposed on said first transparent plate;
   (c) a diffraction grating provided in two parts on a surface of said first transparent plate in opposed relationship to said second transparent plate, said grating having a reflective layer thereon and having a flat zone arranged between said two parts; and
   (d) binder means for binding said first and said second transparent plates, said binder means having a refractive index which is the same as that of said first and said second plates and filling a gap between said first and said second transparent plates.

3. A light measuring device for a camera comprising:
   (a) an optical system for forming an object image on a light sensing part;
   (b) an element for measuring brightness of the object image;
   (c) a focus detecting element for sensing a light beam from the object image; and
   (d) a diffraction structure for distributing the object light to the brightness measuring element and the focus detecting element, said diffraction structure reflecting the object light and directing it to the brightness measuring element and having a portion which allows passage of the object light without diffraction and directing the object light therethrough to the focus detecting element.

4. A light measuring device according to claim 3, further comprising:
   filter means arranged on an optical path of the object light incident on the beam splitter so as to change over light measuring sensitivity distribution of the light measuring.

5. A light measuring device according to claim 4, wherein said filter means has a plurality of light shading members having penetrating holes so as to change the light measuring sensitivity distribution according to the change of the positional relation of said light shading members.

6. A light measuring device according to claim 4, wherein said filter means is a liquid crystal.

7. A light measuring device for a camera according to claim 3, wherein said portion is located near an optical axis of said optical system.

* * * * *